United States Patent [19]

Sekhar et al.

[11] Patent Number: 5,420,399

[45] Date of Patent: May 30, 1995

[54] ELECTRICAL HEATING ELEMENT, RELATED COMPOSITES, AND COMPOSITION AND METHOD FOR PRODUCING SUCH PRODUCTS USING DIELESS MICROPYRETIC SYNTHESIS

[75] Inventors: Jainagesh A. Sekhar; Naiping Zhu, both of Cincinnati, Ohio

[73] Assignee: University of Cincinnati, Cincinnati, Ohio

[21] Appl. No.: 177,009

[22] Filed: Jan. 3, 1994

Related U.S. Application Data

[60] Division of Ser. No. 847,782, Mar. 5, 1992, which is a continuation-in-part of Ser. No. 822,181, Jan. 16, 1992, abandoned.

[51] Int. Cl.$^6$ .............................................. C04B 35/65
[52] U.S. Cl. ..................................... 219/553; 501/127
[58] Field of Search ................................. 501/96–98, 501/127; 219/553, 552

[56] References Cited

U.S. PATENT DOCUMENTS

| | | | |
|---|---|---|---|
| 3,090,094 | 5/1963 | Schwartzwalder et al. | 25/156 |
| 3,097,930 | 7/1963 | Holland | 25/156 |
| 3,111,396 | 11/1963 | Ball | 25/156 |
| 3,314,876 | 4/1967 | Ransley | 204/291 |
| 3,330,756 | 7/1967 | Ransley | 204/279 |
| 3,345,440 | 10/1967 | Googin et al. | 264/29 |
| 3,608,599 | 9/1971 | Spear | 150/33 |
| 3,617,358 | 11/1971 | Dittrich | 75/232 |
| 3,668,599 | 6/1972 | Schrewelius | 338/289 |
| 3,705,791 | 12/1972 | Bredzs | 29/195 |
| 3,726,643 | 4/1973 | Merzhanov et al. | 423/409 |
| 3,778,249 | 12/1973 | Benjamin | 75/0.5 BC |
| 3,872,419 | 3/1975 | Groves et al. | 338/25 |
| 3,893,917 | 7/1975 | Pryor et al. | 210/69 |
| 3,947,363 | 3/1976 | Pryor et al. | 210/510 |
| 3,962,081 | 6/1976 | Yarwood et al. | 210/69 |
| 3,969,696 | 7/1976 | Wolfe et al. | 219/541 |

(List continued on next page.)

FOREIGN PATENT DOCUMENTS

| | | |
|---|---|---|
| 0126555 | 11/1984 | European Pat. Off. |
| 0164830 | 12/1985 | European Pat. Off. |
| 0192602 | 8/1986 | European Pat. Off. |
| 0258510 | 9/1986 | European Pat. Off. |
| 0404943 | 1/1991 | European Pat. Off. |
| 1096063 | 4/1989 | Japan . |
| 5-47455 | 2/1993 | Japan .................................. 219/553 |
| 584052 | 12/1977 | U.S.S.R. |
| 9003956 | 4/1990 | WIPO . |
| 9013513 | 11/1990 | WIPO . |

OTHER PUBLICATIONS

J. W. McCauley et al. "Simultaneous Preparation . . . ", Ceramic Engineering, 3 (1982), pp. 538–554.

R. W. Rice et al. "Effects of Self-Propagating . . . ", Ceramic Engineering, 7 (1986), pp. 737–749.

H. C. Yi, et al. "Self-Propagating High-Temperature (Combustion) Synthesis (SHS) of Powder-Compacted Materials " Journal Materials Science, 25 (1990) pp. 1159–1168.

C. H. Samans "Powder Metallurgy", American Society For Metals, Metals Handbook, 1948, pp. 47–52.

Subrahmanyam et al., Review: Self Propagating High--Temperature Synthesis. J. Mabo Sci., vol. 27, (992, pp. 6249–6273).

*Primary Examiner*—Teresa I. Walberg
*Attorney, Agent, or Firm*—Frost & Jacobs

[57] ABSTRACT

Electrical heating elements and related articles having oxidation resistance at high temperatures, produced by a method involving micropyretic synthesis. A composition subjected to micropyretic synthesis includes a filler material, a reactive system capable of undergoing micropyretic synthesis, and (optionally) a plasticizer or extrusion agent. The method of preparation of articles includes slurry techniques, plastic extrusion, slip casting, or coating.

4 Claims, No Drawings

U.S. PATENT DOCUMENTS

| | | | |
|---|---|---|---|
| 4,003,014 | 1/1977 | Branson et al. | 338/329 |
| 4,024,056 | 5/1977 | Yarwood et al. | 210/69 |
| 4,081,371 | 3/1978 | Yarwood et al. | 210/69 |
| 4,193,106 | 3/1980 | Coleman | 361/275 |
| 4,202,691 | 5/1980 | Yurasko, Jr. | 75/252 |
| 4,217,948 | 8/1980 | Merzhanov et al. | 164/115 |
| 4,257,810 | 3/1981 | Narumiya | 106/42 |
| 4,258,099 | 3/1981 | Narumiya | 428/311 |
| 4,267,435 | 5/1981 | Best | 219/552 |
| 4,391,918 | 7/1983 | Brockmeyer | 501/127 |
| 4,405,433 | 9/1983 | Payne | 204/225 |
| 4,459,363 | 7/1984 | Holt | 501/96 |
| 4,610,726 | 9/1986 | King | 75/233 |
| 4,655,830 | 4/1987 | Akashi et al. | 501/96 |
| 4,697,632 | 10/1987 | Lirones | 164/369 |
| 4,710,348 | 12/1987 | Brupbacher et al. | 420/129 |
| 4,738,389 | 4/1987 | Moshier et al. | 228/198 |
| 4,747,873 | 9/1987 | Kamioka | 74/229 |
| 4,751,048 | 6/1988 | Christodoulou et al. | |
| 4,772,452 | 9/1988 | Brupbacher et al. | 420/129 |
| 4,774,052 | 9/1988 | Nagle et al. | 420/129 |
| 4,800,065 | 1/1989 | Christodoulou et al. | 420/129 |
| 4,836,982 | 6/1989 | Brupbacher et al. | 420/129 |
| 4,877,759 | 10/1989 | Holt et al. | 501/96 |
| 4,902,457 | 2/1990 | Wada et al. | 264/43 |
| 4,904,424 | 2/1990 | Johnson | 264/566 |
| 4,909,842 | 3/1990 | Dunmead et al. | 75/236 |
| 4,915,903 | 4/1990 | Brupbacher et al. | 429/128 |
| 4,915,905 | 4/1990 | Kampe et al. | 420/418 |
| 4,948,761 | 8/1990 | Hida | 501/89 |
| 4,957,885 | 9/1990 | Hida | 501/89 |
| 4,965,044 | 10/1990 | Miyamoto et al. | 419/12 |
| 4,975,412 | 12/1990 | Okazaki et al. | 505/1 |
| 4,985,202 | 1/1991 | Moshier et al. | 420/590 |
| 4,988,480 | 1/1991 | Merzhanov et al. | 419/11 |
| 4,988,645 | 1/1991 | Holt et al. | 501/91 |
| 4,990,295 | 2/1991 | Hida | 264/65 |
| 4,999,144 | 3/1991 | Miyamoto | 564/56 |
| 5,006,290 | 4/1991 | Hida | 264/65 |
| 5,011,800 | 4/1991 | Abramovici et al. | 501/96 |
| 5,019,454 | 5/1991 | Busse | 75/252 |
| 5,022,991 | 6/1991 | Day et al. | 210/506 |
| 5,030,600 | 7/1991 | Hida et al. | 501/98 |
| 5,032,332 | 7/1991 | Hida et al. | 214/65 |
| 5,071,797 | 12/1991 | Hida | 501/87 |
| 5,110,688 | 5/1992 | Sehkar et al. | 75/233 |
| 5,139,594 | 8/1992 | Rabin | 156/89 |
| 5,143,668 | 9/1992 | Hida | 264/63 |
| 5,145,619 | 9/1992 | Abramovici | 264/60 |
| 5,149,677 | 9/1992 | Merzhanov et al. | 501/96 |
| 5,169,572 | 12/1992 | Matthews | 264/27 |
| 5,188,678 | 2/1993 | Sekhar et al. | 148/514 |
| 5,198,188 | 3/1993 | Holt et al. | 419/45 |
| 5,213,730 | 5/1993 | Hida | 501/98 |
| 5,217,583 | 6/1993 | Sekhar et al. | 204/67 |
| 5,221,647 | 6/1993 | Hida et al. | 501/98 |
| 5,316,718 | 5/1994 | Sekhar | |
| 5,340,014 | 8/1994 | Sekhar et al. | 204/67 |
| 5,340,448 | 8/1994 | Sekhar et al. | |

ELECTRICAL HEATING ELEMENT, RELATED COMPOSITES, AND COMPOSITION AND METHOD FOR PRODUCING SUCH PRODUCTS USING DIELESS MICROPYRETIC SYNTHESIS

This is a divisional of application Ser. No. 07/847,782, filed Mar. 5, 1992, which is a continuation-in-part of 07/822,181 filed Jan. 16, 1992, now abandoned.

BACKGROUND OF THE INVENTION

1. Field of the Invention

This invention uses a novel technique to make electrical heating elements which may be used up to 1900° C. This technique also provides new methods for manufacturing ceramic composites, which may be used as both electrical heating elements and oxidation resistant materials.

2. Description of the Prior Art

Generally, heating elements are made from metals like Mo and W, and alloys like Fe-Cr-Al and Ni-Cr, SiC and metal silicides. The alloy heating element is produced by melting in the electric induction or arc furnaces (sometimes alloys have to be melted several times to achieve homogeneity) and then is pressed or extruded. Silicon carbide and molybdenum disilicide heating elements are made by powder metallurgy and have to be sintered at high temperatures and extended times in $H_2$ and CO atmospheres. In the powder metallurgy industry, sintering is often the most costly step of the total manufacturing process, especially when high temperature sintering is involved. Melting and casting are also costly. In addition, because the manufacture of conventional materials is limited by processing, heating elements can be produced only within a predetermined resistivity range.

It is evident that the prior art methods exhibit serious disadvantages, and it is a primary object of the present invention to obviate these by providing a micropyretic synthesis method and composition for production of electrical heating elements and oxidation resistant materials.

SUMMARY OF THE INVENTION

Micropyretic synthesis (also called combustion synthesis) is a technique which uses the heat release from a reaction for synthesis of a product. This exothermic reaction can become self-sustaining and will propagate throughout the reactant mixture in the form of a combustion wave. When the combustion wave advances, the reactants are converted to the products. There are three main parameters important to the micropyretic synthesis process: (1) combustion temperature, (2) ignition temperature at which a sample will become self-propagating, and (3) the velocity of wave propagation. This invention utilizes micropyretic synthesis to make the desired product.

In comparison to prior art methods, micropyretic synthesis provides: (i) energy-saving because of the use of self-sustaining reactions, (ii) simplicity, (iii) reliability of the process, (iv) relative purity of the products, (v) low cost of original powders, and (vi) very low processing costs when compared to conventional methods. It is advantageous if a cheap powder and self-sustaining reactions can be used during the preparation of electric heating elements.

According to the invention there is provided a composition comprising a filler material, at least one reactive system, and optionally a plasticizer (or extrusion agent). Fillers may be SiC, $MoSi_2$, $Cr_2C_3$, WC, $Al_2O_3$, $SiO_2$, $SnO_2$, C, Be, La, Co, Ni, rare earths, ZnO, $Y_2O_3$, $ZrO_2$, Cu, Ni-Co based superalloys, $Sb_2O_3$, CuO, $Fe_2O_3$, GeO, $Fe_3O_4$, $V_2O_5$, FeO, Mo, Nb, Cr, Al, Si, Y, Fe, $Si_3N_4$, B, or alloys and mixtures thereof. Fillers may also be naturally occurring minerals such as sand or clay. The content of fillers may range up to 95% (of the total weight). The reactive system comprises at least two combustible materials which will react exothermically with one another by micropyretic synthesis and are present in such proportion to one another that combustion will occur when ignited. The reactive systems and ceramic phases formed thereby may be any of those in Table I. Various combinations of these combustible materials may be used. Non-stoichiometric weights may also be chosen as long as combustion can be made to occur. The content of the reactive system can range from about 5% to 95% by weight of the total composition. Plasticizers or extrusion agents such as polyvinyl butyral, polyurethane, colloidal silica, 2%-5% aqueous chemical cellulose solution, phosphoric acid, bentonite, fused silica and its activator, may form 0-90% of the total weight of the composition.

Preferably the composition of the invention contains, in weight percent based on the total weight, from about 20% to about 85% filler material, about 15% to about 85% reactive system, and 0% to about 25% plasticizer.

Any one or more of the preferred ranges set forth above can be used with any one or more of the broad ranges for the remaining components indicated above.

TABLE I
COMBUSTIBLE MATERIALS, REACTION PRODUCTS AND STOICHIOMETRIC WEIGHTS

| Reaction | Weight % |
|---|---|
| Ni + Al = NiAl | Ni:68.5, Al:31.5 |
| 3Ni + Al = $Ni_3Al$ | Ni:86.7, Al:13.3 |
| $3Cr_2O_3$ + 6Al + 4C = $2Cr_3C_2$ + $3Al_2O_3$ | $Cr_2O_3$:69, Al:24, C:7 |
| $MoO_3$ + 2Al + B = MoB + $Al_2O_3$ | $MoO_3$:69, Al:25.9, B:5.1 |
| $MoO_3$ + 2Al + 2Si = $MoSi_2$ + $Al_2O_3$ | $MoO_3$:57, Al:21, Si:22 |
| Ti + 2B = $TiB_2$ | Ti:68.9, B:31.1 |
| 5Ti + 3Si = $Ti_5Si_3$ | Ti:74, Si:26 |
| Nb + 2Al = $NbAl_2$ | Nb:63.3, Al:36.7 |
| Zr + 2B = $ZrB_2$ | Zr:80.8, B:19.2 |
| Nb + 2B = $NbB_2$ | Nb:81.1, B:18.9 |
| $Fe_2O_3$ + 2Al = $Al_2O_3$ + 2Fe | $Fe_2O_3$:74.7, Al:25.3 |
| $Cr_2O_3$ + 2Al = $Al_2O_3$ + 2Cr | $Cr_2O_3$:73.8, Al:26.2 |
| 0.86Ti + 1.72B + 1.48Al = $0.86TiB_2$ + 1.48Al | Ti:41.3, B:18.7, Al:40 |
| Ti + B = TiB | Ti:81.6, B:18.4 |
| Hf + 2B = $HfB_2$ | Hf:89.2, B:10.8 |
| Ta + 2B = $TaB_2$ | Ta:89.3, B:10.7 |
| Ti + C = TiC | Ti:80, C:20 |
| Ti + Ni = TiNi | Ti:44.9, Ni:55.1 |
| Ti + Pd = TiPd | Ti:31.0, Pd:69.0 |
| Ti + Al = TiAl | Ti:64, Al:36 |
| Ti + Fe = TiFe | Ti:46.2, Fe:53.8 |
| Ti + C + 0.68Ni = TiC + 0.68Ni | Ti:48, C:12, Ni:40 |

The proportion of combustible material to filler in the electrical heating element is critical, since the combustible content will change the composition of final products and combustion temperature. For instance, the combustion temperature of the $MoO_3+2Al+2Si$ system is as high as 3300° K. It is known that the melting point of its reaction product (MoSi$_2$) is 2293° K. and that the final products may, therefore, melt. Enough filler or diluent is thus necessary in order to keep the original shape of the product and a crack free surface. However, too low a combustible material content will lead to low combustion temperatures so that the final product will not be well-bonded and will display weak room temperature strength. Fillers have three important effects on the products: (1) the fillers act as diluent of the combustion process; (2) they form a part of the final composition and act as a reinforcement to the combustion products, (for instance, MoSi$_2$ shows very low room temperature fracture toughness and low yield strength levels at elevated temperatures. It must therefore be reinforced by some kind of filler such as ZrO$_2$, Al$_2$O$_3$, SiO$_2$, SiC, etc.); and (3) fillers may also act as sintering aids, (e.g., Y$_2$O$_3$ addition will enhance the sintering during combustion). Filler contents have significant effects on electrical resistance, room temperature fracture toughness, and oxidation resistance at elevated operating temperatures of final products. In the exemplary embodiments disclosed hereinafter filler and combustion sources were chosen according to the following criteria: (1) adequate mechanical strength, (2) high oxidation resistance at designed working temperature, (3) thermal stability between filler and combustion source at working temperature, (4) resistance to thermal shock when subject to heating and cooling, (5) slow grain growth, (6) combustion temperature, and (7) electrical resistance.

The present invention further provides a method of preparing composite articles, in particular electrical heating elements, comprising the steps of:
(a) blending a mixture comprising up to 95% by weight of a particulate filler material, between about 5% and 95% by weight of at least one reactive system, wherein said reactive system comprises at least two particulate combustible materials which will react exothermically with one another by micropyretic synthesis and are present in such proportion to one another that combustion will occur when ignited, up to 90% of a plasticizer, and a sufficient amount of solvent in order to form a slurry;
(b) fashioning said slurry into a final desired article shape; and
(c) combusting said shape by ignition at a temperature between about 150° C. and 1250° C.

An electrical heating element or ceramic composite article in accordance with the invention, which may be used at temperatures up to 1900° C., comprises a ceramic composite formed by micropyretic synthesis of a composition containing: (a) up to 95% by weight of a filler material; and (b) between about 5% and about 95% by weight of at least one reactive system, wherein said reactive system comprises at least two combustible materials which will react exothermically with one another by micropyretic synthesis and are present in such proportion to one another that combustion will occur when ignited.

Ignition may be effected by a heat source such as a flame, laser, electron beam or welding electrode, or by passing the shaped article through an induction coil or a furnace heated to ignition temperature.

DETAILED DESCRIPTION OF THE INVENTION

Since the method of the invention permits preparation of composites with different volume fractions of constituent phases, it is readily possible for the first time to control the electrical resistance, and the change in electrical resistance with temperature changes. For example, silicon carbide has a negative slope of resistance vs. temperature, whereas MoSi$_2$ has a positive slope. Judicious combination of these filler materials may thus provide a very slight change in resistance vs. temperature. The room temperature resistivity of heating elements of the invention can be tailored to range from 30$\mu$ ohm cm to 20 ohm cm.

As will be evident from the compositions set forth hereinafter, the best known mode of carrying out the invention includes the use of the following compositions, all percentages being by weight.

A - A filler material comprising at least one of from about 20% to about 80% MoSi$_2$, up to about 30% chromium, up to about 15% iron, up to about 6% molybdenum, up to about 2% titanium, up to about 1.2% niobium, up to about 0.7% yttrium, up to about 2.5% aluminum, up to about 10% silver, up to about 42% silicon carbide, up to about 12% Y$_2$O$_3$, up to about 2.5% Al$_2$O$_3$, up to about 8% SiO$_2$, and up to about 2.5% MgO; a reactive system comprising from about 12% to about 35% nickel, and about 3% to about 13% aluminum; and a plasticizer which when present comprises about 8% to about 12% of a 2.5% aqueous chemical cellulose solution.

B - A filler material comprising at least one of from 0% to about 75% MoSi$_2$, about 8% to about 10% SiO$_2$, up to about 2% silicon, about 0.8% to about 40% silicon carbide, up to about 0.5% boron, up to about 8% Y$_2$O$_3$, and up to about 2% Si$_3$N$_4$; a reactive system comprising from about 7% to about 28% Cr$_2$O$_3$, about 2.5% to about 10% aluminum, and about 0.7% to about 3% carbon; and a plasticizer comprising at least one of from about 4% to about 5% polyvinyl butyral, and about 8% to about 12% of a 2.5% aqueous chemical cellulose solution.

C - A filler material comprising at least one of from about 1% to about 50% silicon carbide, up to about 71% MoSi$_2$, up to about 10% SiO$_2$, up to about 10% Y$_2$O$_3$, up to about 10% Si$_3$N$_4$, up to about 0.5% BN, up to about 1% chromium, up to about 1% boron, up to about 0.5% aluminum, up to about 10% Al$_2$O$_3$, up to about 0.5% silicon, and up to about 7% ZrO$_2$; a reactive system comprising from about 7% to about 30% MoO$_3$, about 2.5% to about 11% aluminum, and about 2.5% to about 38% silicon and up to about 11% carbon; and a plasticizer comprising at least one of from about 10% to about 15% polyvinyl butyral, about 8% to about 15% of a 2.5% aqueous chemical cellulose solution, about 8% to about 10% fused silica and its activator, and about 4% to about 10% bentonite.

D - A filler material comprising at least one of from about 35% to about 40% silicon carbide, about 7% to about 8% Y$_2$O$_3$, about 1.7% to about 2% Al$_2$O$_3$, about 7% to about 8% SiO$_2$, and about 1.7% to about 2% MgO; a reactive system comprising from about 25% to about 30% titanium, and about 9% to about 11% silicon; and a plasticizer comprising from about 8% to about 12% of a 2.5% aqueous chemical cellulose solution.

Compositions embodying the invention are as follows, it being understood that these are illustrative and not limiting:

| | Composition A | |
|---|---|---|
| Combustible | Ni | 17.34 (g) |
| | Al | 2.66 (g) |
| Filler | MoSi$_2$ | 80.0 (g) |
| Plasticizer | | 0 |
| | Composition B | |
| Combustible | Ni | 26.0 (g) |
| | Al | 4.00 (g) |
| Filler | MoSi$_2$ | 70.0 (g) |
| Plasticizer | | 0 |
| | Composition C | |
| Combustible | Ni | 34.68 (g) |
| | Al | 5.32 (g) |
| Filler | MoSi$_2$ | 60.0 (g) |
| Plasticizer | | 0 |
| | Composition D | |
| Combustible | Ni | 13.70 (g) |
| | Al | 6.30 (g) |
| Filler | MoSi$_2$ | 80.0 (g) |
| Plasticizer | | 0 |
| | Composition E | |
| Combustible | Ni | 15.00 (g) |
| | Al | 7.05 (g) |
| Filler | MoSi$_2$ | 70.00 (g) |
| | Cr | 5.25 (g) |
| | Mo | 0.60 (g) |
| | Ti | 1.70 (g) |
| | B | 0.40 (g) |
| Plasticizer | | 0 |
| | Composition F | |
| Combustible | Ni | 27.40 (g) |
| | Al | 12.60 (g) |
| Filler | MoSi$_2$ | 20.00 (g) |
| | Fe | 5.30 (g) |
| | Cr | 30.00 (g) |
| | Mo | 1.60 (g) |
| | Nb | 1.17 (g) |
| | Y | 0.67 (g) |
| | Al | 1.00 (g) |
| Plasticizer | | 0 |
| | Composition G | |
| Combustible | Ni | 24.66 (g) |
| | Al | 11.34 (g) |
| Filler | MoSi$_2$ | 40.00 (g) |
| | Fe | 4.00 (g) |
| | Cr | 18.00 (g) |
| | Mo | 1.00 (g) |
| | Nb | 0.50 (g) |
| | Y | 0.50 (g) |
| Plasticizer | | 0 |
| | Composition H | |
| Combustible | Ni | 12.33 (g) |
| | Al | 5.67 (g) |
| Filler | MoSi$_2$ | 75.00 (g) |
| | Fe | 1.50 (g) |
| | Cr | 2.50 (g) |
| | Al | 2.50 (g) |
| Plasticizer | | 0 |
| | Composition I | |
| Combustible | Ni | 12.33 (g) |
| | Al | 5.67 (g) |
| Filler | MoSi$_2$ | 75.00 (g) |
| | Fe | 3.00 (g) |
| | Cr | 2.50 (g) |
| | Al | 1.00 (g) |
| | B | 0.50 (g) |
| Plasticizer | | 0 |
| | Composition J | |
| Combustible | Ni | 17.13 (g) |
| | Al | 7.88 (g) |
| Filler | MoSi$_2$ | 70.00 (g) |
| | Fe | 2.50 (g) |
| | Cr | 1.00 (g) |
| | Al | 1.00 (g) |
| | B | 0.50 (g) |
| Plasticizer | | 0 |
| | Composition K | |
| Combustible | Ni | 17.13 (g) |
| | Al | 7.88 (g) |
| Filler | MoSi$_2$ | 75.00 (g) |
| Plasticizer | | 0 |
| | Composition L | |
| Combustible | Ni | 13.70 (g) |
| | Al | 6.30 (g) |
| Filler | MoSi$_2$ | 70.00 (g) |
| | Ag | 10.0 (g) |
| Plasticizer | | 0 |
| | Composition M | |
| Combustible | Cr$_2$O$_3$ | 8.70 (g) |
| | Al | 3.05 (g) |
| | C | 0.89 (g) |
| Filler | MoSi$_2$ | 75.00 (g) |
| | SiO$_2$ | 10.00 (g) |
| | Si | 1.00 (g) |
| | SiC | 1.00 (g) |
| | B | 0.30 (g) |
| Plasticizer | Polyvinyl Butyral | 5.00 (g) |
| | Composition N | |
| Combustible | Cr$_2$O$_3$ | 15.50 (g) |
| | Al | 5.45 (g) |
| | C | 1.58 (g) |
| Filler | MoSi$_2$ | 65.00 (g) |
| | SiO$_2$ | 10.00 (g) |
| | Si | 1.00 (g) |
| | SiC | 1.00 (g) |
| | B | 0.50 (g) |
| Plasticizer | Polyvinyl Butyral | 5.00 (g) |
| | Composition O | |
| Combustible | Cr$_2$O$_3$ | 13.70 (g) |
| | Al | 4.80 (g) |
| | C | 1.40 (g) |
| Filler | MoSi$_2$ | 65.00 (g) |
| | SiO$_2$ | 10.00 (g) |
| | Si | 2.00 (g) |
| | SiC | 2.5 (g) |
| | B | 0.5 (g) |
| Plasticizer | Polyvinyl Butyral | 5.00 (g) |
| | Composition P | |
| Combustible | MoO$_3$ | 17.1 (g) |
| | Al | 6.30 (g) |
| | Si | 6.60 (g) |
| Filler | MoSi$_2$ | 60.00 (g) |
| | SiC | 1.50 (g) |
| | SiO$_2$ | 8.00 (g) |
| | Si$_3$N$_4$ | 0.50 (g) |
| Plasticizer | 2.5% aqueous chemical cellulose solution | 15.00 (g) |
| | Composition Q | |
| Combustible | MoO$_3$ | 17.10 (g) |
| | Al | 6.30 (g) |
| | Si | 6.6 (g) |
| Filler | MoSi$_2$ | 60.00 (g) |
| | SiO$_2$ | 7.00 (g) |
| | BN | 0.50 (g) |
| | Cr | 0.70 (g) |
| | B | 0.30 (g) |
| | SiC | 1.5 (g) |
| Plasticizer | Polyvinyl Butyral | 10.00 (g) |
| | Composition R | |
| Combustible | MoO$_3$ | 7.85 (g) |
| | Al | 3.00 (g) |
| | Si | 3.15 (g) |
| Filler | MoSi$_2$ | 78.00 (g) |
| | SiO$_2$ | 4.80 (g) |
| | BN | 0.50 (g) |
| | Cr | 0.70 (g) |
| | B | 0.30 (g) |
| | SiC | 1.5 (g) |
| | Al | 0.5 (g) |
| | Si | 0.5 (g) |

|  |  |  |
|---|---|---|
| Plasticizer | Polyvinyl Butyral | 10.00 (g) |

Composition S

| Combustible | MoO$_3$ | 17.1 (g) |
|---|---|---|
|  | Al | 6.30 (g) |
|  | Si | 6.60 (g) |
| Filler | MoSi$_2$ | 6.00 (g) |
|  | SiC | 61.50 (g) |
|  | SiO$_2$ | 2.00 (g) |
|  | Si$_3$N$_4$ | 0.50 (g) |
| Plasticizer | 2.5% aqueous chemical cellulose solution | 15.00 (g) |

Composition T

| Combustible | MoO$_3$ | 17.1 (g) |
|---|---|---|
|  | Al | 6.3 (g) |
|  | Si | 6.60 (g) |
| Filler | MoSi$_2$ | 60.00 (g) |
|  | SiC | 2.00 (g) |
| Plasticizer | Bentonite | 8.00 (g) |

Composition U

| Combustible | MoO$_3$ | 17.1 (g) |
|---|---|---|
|  | Al | 6.3 (g) |
|  | Si | 6.60 (g) |
| Filler | MoSi$_2$ | 60.00 (g) |
|  | SiC | 1.5 (g) |
|  | Si$_3$N$_4$ | 0.50 (g) |
|  | Y$_2$O$_3$ | 3.00 (g) |
| Plasticizer | Bentonite | 5.00 (g) |

Composition V

| Combustible | MoO$_3$ | 25.65 (g) |
|---|---|---|
|  | Al | 9.45 (g) |
|  | Si | 9.90 (g) |
| Filler | MoSi$_2$ | 50.00 (g) |
|  | SiC | 1.0 (g) |
| Plasticizer | Bentonite | 4.00 (g) |

Composition W

| Combustible | MoO$_3$ | 17.1 (g) |
|---|---|---|
|  | Al | 6.30 (g) |
|  | Si | 6.60 (g) |
| Filler | MoSi$_2$ | 60.00 (g) |
|  | SiC | 1.5 (g) |
|  | SiO$_2$ | 8.0 (g) |
|  | Si$_3$N$_4$ | 0.50 (g) |
|  | Y$_2$O$_3$ | 3.00 (g) |
| Plasticizer | Polyvinyl Butyral | 15.00 (g) |

Composition X

| Combustible | MoO$_3$ | 17.1 (g) |
|---|---|---|
|  | Al | 6.30 (g) |
|  | Si | 6.60 (g) |
| Filler | MoSi$_2$ | 60.00 (g) |
|  | SiC | 1.50 (g) |
|  | SiO$_2$ | 8.00 (g) |
|  | Si$_3$N$_4$ | 0.50 (g) |
| Plasticizer | Polyvinyl Butyral | 15.00 (g) |

Composition Y

| Combustible | MoO$_3$ | 17.1 (g) |
|---|---|---|
|  | Al | 6.30 (g) |
|  | Si | 6.60 (g) |
| Filler | MoSi$_2$ | 60.00 (g) |
|  | SiC | 1.50 (g) |
|  | ZrO$_2$ | 8.00 (g) |
|  | Si$_3$N$_4$ | 0.50 (g) |
| Plasticizer | Polyvinyl Butyral | 15.00 (g) |

Composition Z

| Combustible | MoO$_3$ | 17.1 (g) |
|---|---|---|
|  | Al | 6.30 (g) |
|  | Si | 6.60 (g) |
| Filler | MoSi$_2$ | 60.00 (g) |
|  | SiC | 1.50 (g) |
|  | Si$_3$N$_4$ | 0.50 (g) |
| Plasticizer | Fused silica & activator | 10.00 (g) |

Composition AA

| Combustible | MoO$_3$ | 17.1 (g) |
|---|---|---|
|  | Al | 6.30 (g) |
|  | Si | 6.60 (g) |
| Filler | MoSi$_2$ | 60.00 (g) |
|  | SiC | 1.50 (g) |
|  | Si$_3$N$_4$ | 0.50 (g) |
|  | Silica | 8.00 (g) |
| Plasticizer | Liquid Silica & activator | 10.00 (g) |

Composition BB

| Combustible | MoO$_3$ | 17.1 (g) |
|---|---|---|
|  | Al | 6.30 (g) |
|  | Si | 6.60 (g) |
| Filler | MoSi$_2$ | 60.00 (g) |
|  | SiC | 1.50 (g) |
|  | Si$_3$N$_4$ | 0.50 (g) |
|  | Y$_2$O$_3$ | 3.00 (g) |
| Plasticizer | Silica & activator | 10.00 (g) |

Composition CC

| Combustible | MoO$_3$ | 17.1 (g) |
|---|---|---|
|  | Al | 6.30 (g) |
|  | Si | 6.60 (g) |
| Filler | MoSi$_2$ | 60.00 (g) |
|  | SiC | 9.50 (g) |
|  | Si$_3$N$_4$ | 0.50 (g) |
| Plasticizer | Polyvinyl Butyral | 15.00 (g) |

Composition DD

| Combustible | MoO$_3$ | 17.1 (g) |
|---|---|---|
|  | Al | 6.30 (g) |
|  | Si | 6.60 (g) |
| Filler | MoSi$_2$ | 60.00 (g) |
|  | SiC | 9.50 (g) |
|  | Si$_3$N$_4$ | 0.50 (g) |
| Plasticizer | "750 Cotronics"* fused silica & activator | 15.00 (g) |

*from Cotronics Corp., 3379 Shore Pkwy., Brooklyn, NY 11235.

Composition EE

| Combustible | MoO$_3$ | 28.50 (g) |
|---|---|---|
|  | Al | 10.50 (g) |
|  | Si | 11.00 (g) |
| Filler | SiC | 40.00 (g) |
| Plasticizer | Bentonite | 10.00 (g) |

Composition FF

| Combustible | MoO$_3$ | 22.80 (g) |
|---|---|---|
|  | Al | 8.40 (g) |
|  | Si | 8.80 (g) |
| Filler | SiC | 40.00 (g) |
|  | Y$_2$O$_3$ | 8.00 (g) |
|  | Si$_3$N$_4$ | 2.00 (g) |
| Plasticizer | Bentonite | 10.00 (g) |

Composition GG

| Combustible | MoO$_3$ | 22.80 (g) |
|---|---|---|
|  | Al | 8.40 (g) |
|  | Si | 8.80 (g) |
| Filler | SiC | 40.00 (g) |
|  | Y$_2$O$_3$ | 8.00 (g) |
|  | Si$_3$N$_4$ | 2.00 (g) |
|  | SiO$_2$ | 10.00 (g) |
| Plasticizer | 2.5% aqueous chemical cellulose solution | 10.00 (g) |

Composition HH

| Combustible | Cr2O3 | 27.60 (g) |
|---|---|---|
|  | Al | 9.60 (g) |
|  | C | 2.80 (g) |
| Filler | SiC | 40.00 (g) |
|  | Y$_2$O$_3$ | 8.00 (g) |
|  | Si$_3$N$_4$ | 2.00 (g) |
|  | SiO2 | 10.00 (g) |
| Plasticizer | 2.5% aqueous chemical cellulose solution | 10.00 (g) |

Composition II

| Combustible | Ni | 34.68 (g) |
|---|---|---|
|  | Al | 5.32 (g) |
| Filler | SiC | 40.00 (g) |

|  |  | -continued |
|---|---|---|
|  | Y$_2$O$_3$ | 10.00 (g) |
|  | Al$_2$O$_3$ | 2.00 (g) |
|  | SiO2 | 6.00 (g) |
|  | MgO | 2.00 (g) |
| Plasticizer | 2.5% aqueous chemical cellulose solution | 10.00 (g) |
|  | Composition JJ | |
| Combustible | Ni | 21.67 (g) |
|  | Al | 3.33 (g) |
| Filler | SiC | 40.00 (g) |
|  | Fe | 15.00 (g) |
|  | Cr | 3.00 (g) |
|  | Al | 1.00 (g) |
|  | Y$_2$O$_3$ | 8.00 (g) |
|  | Al$_2$O$_3$ | 2.00 (g) |
|  | SiO2 | 6.00 (g) |
| Plasticizer | 2.5% aqueous chemical cellulose solution | 10.00 (g) |
|  | Composition KK | |
| Combustible | Ti | 29.60 (g) |
|  | Si | 10.40 (g) |
| Filler | SiC | 40.00 (g) |
|  | Y$_2$O$_3$ | 8.00 (g) |
|  | Al$_2$O$_3$ | 2.00 (g) |
|  | SiO2 | 8.00 (g) |
|  | MgO | 2.00 (g) |
| Plasticizer | 2.5% aqueous chemical cellulose solution | 10.00 (g) |
|  | Composition LL | |
| Combustible | MoO$_3$ | 22.80 (g) |
|  | Al | 8.40 (g) |
|  | Si | 8.80 (g) |
| Filler | MoSi$_2$ | 10.00 (g) |
|  | SiC | 50.00 (g) |
| Plasticizer | 2.5% cellulose in water | 15.00 (g) |
|  | Composition MM | |
| Combustible | MoO$_3$ | 22.80 (g) |
|  | Al | 8.40 (g) |
|  | Si | 8.80 (g) |
| Filler | MoSi$_2$ | 10.00 (g) |
|  | SiC | 40.00 (g) |
| Plasticizer | Bentonite | 10.00 (g) |
|  | Composition NN | |
| Combustible | MoO$_3$ | 22.80 (g) |
|  | Al | 8.40 (g) |
|  | Si | 8.80 (g) |
| Filler | Si$_3$N$_4$ | 10.00 (g) |
|  | SiC | 40.00 (g) |
| Plasticizer | Bentonite | 10.00 (g) |
|  | Composition OO | |
| Combustible | MoO$_3$ | 19.95 (g) |
|  | Al | 7.35 (g) |
|  | Si | 7.70 (g) |
| Filler | Y$_2$O$_3$ | 10.00 (g) |
|  | SiC | 40.00 (g) |
| Plasticizer | Bentonite | 15.00 (g) |
|  | Composition PP | |
| Combustible | MoO$_3$ | 17.10 (g) |
|  | Al | 9.10 (g) |
|  | Si | 8.80 (g) |
| Filler | Y$_2$O$_3$ | 10.00 (g) |
|  | SiC | 25.00 (g) |
|  | MoSi$_2$ | 20.00 (g) |
| Plasticizer | Bentonite | 10.00 (g) |
|  | Composition QQ | |
| Combustible | MoO$_3$ | 19.95 (g) |
|  | Al | 7.35 (g) |
|  | Si | 12.50 (g) |
| Filler | Y$_2$O$_3$ | 10.00 (g) |
|  | SiC | 40.00 (g) |
| Plasticizer | Bentonite | 10.00 (g) |
|  | Composition RR | |

|  |  | -continued |
|---|---|---|
| Combustible | MoO$_3$ | 14.25 (g) |
|  | Al | 11.30 (g) |
|  | Si | 11.60 (g) |
| Filler | Y$_2$O$_3$ | 10.00 (g) |
|  | SiC | 40.00 (g) |
| Plasticizer | Bentonite | 10.00 (g) |
|  | Composition SS | |
| Combustible | MoO$_3$ | 19.95 (g) |
|  | Al | 7.35 (g) |
|  | Si | 7.70 (g) |
| Filler | Y$_2$O$_3$ | 10.00 (g) |
|  | SiC | 25.00 (g) |
|  | MoSi$_2$ | 20.00 (g) |
| Plasticizer | Bentonite | 10.00 (g) |
|  | Composition TT | |
| Combustible | MoO$_3$ | 17.10 (g) |
|  | Al | 9.00 (g) |
|  | Si | 3.40 (g) |
| Filler | Y$_2$O$_3$ | 10.00 (g) |
|  | SiC | 35.00 (g) |
|  | Al$_2$O$_3$ | 10.00 (g) |
|  | B | 0.50 (g) |
| Plasticizer | Bentonite | 15.00 (g) |
|  | Composition UU | |
| Combustible | MoO$_3$ | 17.10 (g) |
|  | Al | 6.30 (g) |
|  | Si | 16.00 (g) |
| Filler | Y$_2$O$_3$ | 5.60 (g) |
|  | SiC | 35.00 (g) |
|  | Al$_2$O$_3$ | 5.00 (g) |
|  | B | 0.50 (g) |
| Plasticizer | Bentonite | 15.00 (g) |
|  | Composition VV | |
| Combustible | MoO$_3$ | 19.95 (g) |
|  | Al | 7.35 (g) |
|  | Si | 37.20 (g) |
|  | C | 10.50 (g) |
| Filler | Al$_2$O$_3$ | 10.00 (g) |
|  | B | 1.00 (g) |
| Plasticizer | Bentonite | 15.00 (g) |

Processing in accordance with the invention may include the following procedures:

Process I

Step 1. Powders and polyvinyl butyral were weighed according to desired compositions.

Step 2. The weighed powders and polyvinyl butyral were mixed in acetone by ball milling for 2-10 hours with ZrO$_2$ milling media.

Step 3. The thin slurry was then transferred to a large glass container, dried in a 70° oven, and solvent was allowed to evaporate.

Step 4. Dried powder was ground in a mortar for one hour and acetone was added to this powder to form a thick slurry.

Step 5. This thick slurry was ground for one hour to form a plastic mass.

Step 6. This plastic mass was forced through a die at high pressure (5-300 MPa) to produce wires.

Step 7. The green wire was formed into various shapes, e.g., coil, U-shape or straight.

Step 8. The wires from step 7 were dried in air for 1 hour, (these wires were no longer flexible at this time), and then dried in a 70° oven.

Step 9. The wires were combusted in a furnace in air or argon atmosphere in the temperature range of 150° C.-1250° C.

Process II

Step 1. Powders and bentonite were weighed according to desired compositions.

Step 2. The weighed powders and bentonite were mixed in water by ball milling for 2–10 hours with $ZrO_2$ milling media.

Step 3. This thin slurry was moved to a large glass container, dried in a 100° C. oven, and the water was allowed to evaporate.

Step 4. Dried powder was ground in a mortar for one hour and water was added to this powder to form a thick slurry.

Step 5. This thick slurry was ground for one hour to form a plastic mass.

Step 6. This plastic mass was forced through a die at high pressure to produce wires.

Step 7. The green wire was formed into various shapes, e.g., coil, U-shape or straight.

Step 8. The wires from step 7 were dried in air for 2–4 hours (these wires were no longer flexible at this time), and then dried at 110° in the oven, for 2–5 hours.

Step 9. The wires were combusted in a furnace with air or argon atmosphere in the temperature range of 150°–1250° C.

Process III

Step 1. Powders and polyurethane and thinner were weighed according to desired compositions.

Step 2. The weighed powders, polyurethane and thinner were mixed for one half hour.

Step 3. This thin slurry was coated on a porous polyurethane polymer. Coated products were dried in air for about 10 minutes and then coated again; coating thickness was controlled by coating time and slurry viscosity.

Step 4. Coated products were dried in air for 1–2 hours and then at a temperature of 300° C. in an oven for 0.5–2 hours.

Step 5. Coated products were combusted in the range of 150° C.–1200° C. in a furnace, or coated products from step 4 were combusted by a torch.

Process IV

Step 1. Powders and colloidal silica or phosphoric acid were weighed according to desired compositions.

Step 2. The weighed powders and silica were mixed for half an hour.

Step 3. This thin slurry was coated on porous polymer or oxidized $TiB_2$ porous base. Coated products were dried in air for about 10 minutes and then coated again; coating thickness was controlled by coating time and slurry viscosity.

Step 4. Coated products were dried in air for 1–2 hours.

Step 5. Coated products were combusted at 150° C.–1200° C. in a furnace, or coated products from step 4 were combusted with a torch.

Process V

Step 1. Powders and polyvinyl butyral were weighed according to desired compositions.

Step 2. The weighed powders and polyvinyl butyral were mixed in acetone by ball milling for 2–10 hours with $ZrO_2$ milling media.

Step 3. This thin slurry was moved to a large glass container, and dried in a 70° C. oven. Acetone was allowed to evaporate.

Step 4. Dried powder was ground in a mortar for one hour.

Step 5. This powder was pressed in a die to form various kinds of samples, for instance, sandwich samples.

Step 6. The products were combusted in a furnace with air or argon atmosphere in the temperature range of 150°–1250° C.

Process VI

Step 1. Powders and polyvinyl butyral were weighed according to desired compositions.

Step 2. The weighed powders and polyvinyl butyral were mixed in acetone by ball milling for 2–10 hours with a $ZrO_2$ milling media.

Step 3. This thin slurry was moved to a large glass container, and dried in a 70° C. oven. The solvent was allowed to evaporate.

Step 4. Dried powder was ground in a mortar for one hour, and acetone was added to this powder to form a thin slurry.

Step 5. This thin slurry was mixed mechanically for another hour to form a slip.

Step 6. This slurry was cast in a die to form products with various shapes.

Step 7. The sample from step 6 was dried in air for about 10 hours, and then heated at 250° C. in an oven.

Step 8. This sample was combusted in a furnace with air or argon atmosphere in the temperature range of 150°–1250° C.

Process VII

Step 1. Powders were weighed according to desired compositions.

Step 2. The weighed powders were mixed in acetone by ball milling for 2–10 hours with a $ZrO_2$ milling media.

Step 3. Mixed powders were ground in a mortar for one hour.

Step 4. This powder was pressed in a die to form various kinds of samples, for instance, sandwich sample, dog bone shaped samples, etc.

Step 5. The products were combusted in a furnace in air or argon atmosphere in the temperature range of 150°–1250° C.

Process VIII

Step 1. "750 Cotronics" fused silica was ball milled for two days and then sized by −325 mesh sieve.

Step 2. Powders and sieved "750 Cotronics" fused silica were weighed according to desired compositions.

Step 3. The weighed powders and fused silica were mixed in water by ball milling for 2–10 hours with $ZrO_2$ milling media.

Step 4. The thin slurry was moved to a large glass container, dried in a 100° C. oven, and the water was allowed to evaporate.

Step 5. The dried powder was ground in a mortar for one hour, and liquid silica activator was added to the powder to form a thick slurry.

Step 6. The thick slurry was ground for 30 minutes to form a plastic mass.

Step 7. The plastic mass was forced through a die at high pressure to produce wires.

Step 8. The green wire was formed into various shapes, e.g., coil, U-shape or straight.

Step 9. The wires from step 8 were dried in air for 2–4 hours (these wires were no longer flexible at this time), and dried in an oven at 110° C. for 2–5 hours.

Step 10. The wires were combusted in a furnace with air or argon atmosphere in the temperature range of 750°–1250° C.

Process IX

Step 1. Powders were weighed according to desired compositions.

Step 2. The weighed powders were mixed in water by ball milling for 2–10 hours with $ZrO_2$ milling media.

Step 3. The thin slurry was moved to a large glass container, dried in a 110° C. oven, and water was allowed to evaporate.

Step 4. The dried powder was ground in a mortar for one hour and 2.5 wt % chemical cellulose solution in water was added to this powder to form a thick slurry.

Step 5. This thick slurry was ground for another hour to form a plastic mass.

Step 6. This plastic mass was forced through a die at high pressure (5–300 MPa) to produce wires.

Step 7. The green wire was formed into various shapes, e.g., coil, U-shape or straight.

Step 8. The wires from step 7 were dried in air for 1 hour, (these wires were no longer flexible at this time), and then dried at 100° C. in an oven for 2 hours, and then the oven temperature was increased to 400° C. to burn the plasticizer out.

Step 9. The wires were combusted in a furnace in air or argon atmosphere in the temperature range of 700°–1250° C.

Process X

Step 1. Powders were weighed according to desired compositions.

Step 2. The weighted powders were mixed in water by ball milling for 2–10 hours with $ZrO_2$ milling media.

Step 3. This thin slurry was moved to a large glass container, dried in a 100° oven, and the water was allowed to evaporate.

Step 4. Dried powder was ground in a mortar for one hour and 2.5 weight percent aqueous chemical cellulose solution was added to this powder to form a slurry.

Step 5. This slurry was ground for a half hour to form a homogenous mass.

Step 6. This mass was slip cast by molding to form different shapes, e.g., cast plates, or by pressing the mass to form plates, or by working the mass with clay-sculpturing tools to obtain a shape.

Step 7. The green articles from step 6 were dried in air for 2–19 hours (these articles were no longer flexible at this time), and dried at 110° C. in an oven for 2–5 hours.

Step 8. The articles were combusted in a furnace with air or argon atmosphere in the temperature range of 750°–1250° C.

Final products were prepared in accordance with the following non-limiting examples:

EXAMPLE 1

Composition U and Process II were used to make heating elements. The final products (1–10 mm wires) showed very high strength at room temperature and could be used as high temperature heating elements. Samples were run at 1600° C. for 40 hours without any degradation.

EXAMPLE 2

Composition W and Process I were used to make an electrical heating element.

After combustion, the products showed excellent room temperature strength. According to this invention, this high room temperature strength comes not only from filler reaction joining among $SiO_2$, $MoSi_2$, SiC and the reaction product $Al_2O_3$, but also from reaction bonding between $MoSi_2$ reaction products and these fillers. It was found that an increase of the combustible ($MoO_3+2Al+2Si$) content up to a value of 45% by weight of the total composition substantially enhanced the room temperature strength. But if this combustible content were more than 50% by weight, the combustion reaction would become too strong, so that the final products were broken and cracks could form on the surface of the products. The adiabatic temperature of $MoO_3+2Al+2Si$ reaction is as high as 3300 K., which is higher than the melting point of $MoSi_2$. In this reaction, therefore, at least 50% filler and plasticizer were necessary. According to this embodiment, the $MoO_3+2Al+2Si$ reaction is extremely useful in making high temperature heating elements, and oxidation resistance composites. In addition, the fillers such as $Y_2O_3$ and $Al_2O_3$, enhance sintering during combustion. It is essential, in order to obtain the best products, that different particle sizes be used in the sample. The products made from the processing were in the form of wires 1 mm–10 mm in diameter or flat plate 5 mm thick.

These products could be used at high temperatures. Testing was carried out between 1200° and 1600° C. The sample surface was noted to be coated with a protective layer of $SiO_2$ due to the reaction between $MoSi_2$ and oxygen. This thin quartz layer also sealed any of the pores on the surface. On account of the formation of this silica layer the product could be used at high temperatures. The wires were tested in the form of heating elements by passing 5–50 amps through the wires for long times and allowing the samples to attain temperatures between 1200° C. and 1600° C. At 1600° C. the wire ran for 100 hours without any sign of deterioration. The test was discontinued because of the terminals becoming too hot. At 1200° C. the samples ran for over 1400 hours, and the test is still continuing. In this test the terminals were cooled with cooling water. The room temperature resistivity of these samples averaged 90$\mu$ ohm cm before the test and remained 90$\mu$ ohm cm after 1400 hours when the test was briefly interrupted.

EXAMPLE 3

Process III was used to mix 70 grams Ti and 30 grams boron powder by ball milling. 100 ml polyurethane was used as a liquid media and mixed with the Ti and B powder. This slurry was coated on porous polyurethane polymer 3–5 times, and then dried in air for 2 hours and 300° C. oven for 1 hour, respectively. Samples were combusted in the furnace at 800° C., and oxidized at 950° C. for 3 hours. This formed an oxidized $TiB_2$ surface.

EXAMPLE 4

Eighty-seven grams of Ni powder (−100 mesh) and 13 grams of Al (−325 mesh) were mixed with ball milling in accordance with Process III. After milling, the mixed powders were mixed with 100 ml polyurethane. This thin slurry was coated for 1–3 times on the surface of an oxidized $TiB_2$ porous base. The samples were combusted at 1000° C. This porous heating element could be used as a low temperature heater in the temperature range of 300° to 500° C.

EXAMPLE 5

Composition M and Process V were used to make a sandwich sample. A sandwich sample is one which contains layers of different compositions of pressed powders or slurry. A powder mixture with 69 grams of $Cr_2O_3$, 24 grams of Al and 7 grams of carbon were mixed as a combustible source and used as the core of the sandwich. Samples were pressed into a sandwich. After combustion, the core of the sandwich is a composite of $Cr_2O_3$ and $Al_2O_3$ which are porous materials and insulators. The two outside layers were the composite resulting from Composition M. This sample showed high strength for this kind of product. When used as a heating element the sample was noted to remain stable at 1300° C.

EXAMPLE 6

Composition Y and Process I were used to make heating elements. The $ZrO_2$ (partially stabilized) is advantageous in reinforcing $MoSi_2$ since its coefficient of thermal expansion is close to that of $MoSi_2$. It was found that partially stabilized $ZrO_2$ significantly toughened $MoSi_2$, and the final products could be used at temperatures up to 1600° C.

EXAMPLE 7

Composition R and Process I were used to make heating elements. The properties of the final products were comparable to those of Example 1. However, the combustion temperature is lower than that of Composition W used in Example 1.

EXAMPLE 8

Composition Z and Process VIII were used to make heating elements. The "750 Cotronics" fused silica was ball milled for 2 days to decrease the particle size to less than 40 micrometers before mixing with the other powdered material. The fused silica and activator functioned very well as a plasticizer. The plastic mass could be extruded into shapes of various kinds. After drying in air and an oven at 110° C., the samples showed good green strength. The green samples were combusted in the range of 750° to 1200° C. Final products exhibited excellent room temperature strength and could be used as high temperature heating elements in the range of 1000° to 1700° C.

EXAMPLE 9

Composition V and Process II were used to make heating elements. The combustible material comprised 45% by weight of the total composition. The combustion temperature was higher than that noted in compositions having 40% or less combustible material. Composition V could be ignited at relatively low temperatures, on the order of 750°-950° C. At such temperature levels crack-free products were obtained. The final products had very high room temperature strength and could be used as high temperature heating elements.

EXAMPLE 10

Composition R and Process I were used to make heating elements. However, extra Al and Si in the combustible, and Cr and B in the filler, were added to increase the density of the composition. It is believed that the B addition may decrease the melting point of the $SiO_2$ in the mixture, so that the products may be liquid sintered during the combustion step.

EXAMPLE 11

Composition E and Process VIII were used to make heating elements (with omission of steps 1 and 2 since Composition E contained no plasticizer). Samples were combusted in the temperature range of 1000° C. to 1150° C. The final products showed reasonable room temperature strength and could be used as heating elements at temperatures of 500°-900° C.

EXAMPLE 12

Composition AA and Process VIII were used to make high temperature heating elements. Pure $SiO_2$ powder was used as the plasticizer, with "750 Cotronics" liquid silica activator. Since impurities were reduced in the final products by use of pure $SiO_2$, the working temperature range of the heating elements was raised.

EXAMPLE 13

Composition BB and Process VIII were used to make high temperature heating elements, again with pure $SiO_2$ powder and "750 Cotronics" liquid silica activator. These were found to work very well as a plasticizer. The working temperature of the heating elements was increased in comparison to products using bentonite as a plasticizer, due to reduction of the impurity phase.

EXAMPLE 14

Composition CC and Process I were used to make high temperature heating elements and oxidation resistant composites. SiC was used (in place of $SiO_2$) in this composition as part of the filler material, and it was found that the final products could be used at temperatures as high as 1700° C.

EXAMPLE 15

Composition DD, or Composition JJ, and Process X were used to make plate-like heating elements and oxidation resistant composite articles. The final products showed improved room temperature strength and could be used as heating elements in room heaters in place of conventional alloy heating elements or ceramic heating elements. The resistivity of the element prepared from Composition DD was measured at room temperature and found to be 0.2 ohm cm.

Average particle sizes used in the above examples, obtained from commercially available sources, are set forth in Table II. No representation is made that these particle sizes are optimum, but they were found to be operable and hence constitute the best mode now known of carrying out the invention.

TABLE II

| Average Particles Sizes | |
|---|---|
| Ni:3 $\mu$ | Cr:−325 mesh (−44 $\mu$m) |
| $MoSi_2$:3 $\mu$ | C:−300 mesh (−60 $\mu$m) |
| Fe:−200 mesh (−74 $\mu$m) | MgO:−325 mesh (−44 $\mu$m) |
| Nb:−325 mesh (−44 $\mu$m) | Si:−325 mesh (−44 $\mu$m) |
| Al:−325 mesh (−44 $\mu$m) | $Cr_2O_3$:−325 mesh (−44 $\mu$m) |
| $SiO_2$:−325 mesh (−44 $\mu$m) | SiC:1 $\mu$ |
| $Si_3N_4$:0.1-3 $\mu$ | $Y_2O_3$:2 $\mu$ |
| $Al_2O_3$:−325 mesh (−44 $\mu$m) | B:Submicron, amorphous |
| Ti:−325 mesh (−33 $\mu$m) | |

The materials made in accordance with this invention remain stable mechanically and remain resistant to oxidation attack at high temperatures. Consequently they may be also used not only as heating elements but also as materials where high temperature oxidation prevention is a service requirement. Such uses may be in furnaces, aero-space propulsion vehicles, in engines where high temperatures are produced such as jet engines and car engines, or for chemical and electrochemical uses.

We claim:

1. An electrical heating element having improved mechanical stability, room temperature fracture toughness, oxidation resistance at temperatures up to 1900° C., and stable electrical conductivity at said temperatures, comprising a ceramic composite formed by micropyretic synthesis of a non-solid, pliable composition comprising, based on the total weight of said composition:

a filler material selected from the group consisting of up to about 4% chromium, up to about 17% iron, up to about 2% aluminum, about 38–42% silicon carbide, about 6–12% $Y_2O_3$, about 1–3% $Al_2O_3$, about 5–7% $SiO_2$, up to about 2.5% MgO and mixtures thereof;

a reactive system consisting essentially of from about 20% to about 35% nickel and about 3% to about 6% aluminum, which materials will react exothermically with one another and are present in such proportion to one another that combustion will occur when ignited; and as a plasticizer about 8% to about 12% of a 2.5% aqueous ethyl cellulose solution.

2. An electrical heating element having improved mechanical stability, room temperature fracture toughness, oxidation resistance at temperatures up to 1900° C., and stable electrical conductivity at said temperatures, comprising a ceramic composite formed by micropyretic synthesis of a non-solid, pliable composition comprising, based on the total weight of said composition:

a filler material selected from the group consisting of from about 8% to about 10% $SiO_2$, up to about 75% $MoSi_2$ up to about 2% silicon, about 0.8% to about 40% silicon carbide, up to about 0.5% boron, up to about 8% $Y_2O_3$, and up to about 2% $SiN_3N_4$ and mixtures thereof;

a reactive system consisting essentially of from about 7% to about 28% $Cr_2O_3$, about 2.5% to about 10% aluminum, and about 0.7% to about 3% carbon, which materials will react exothermically with one another and are present in such proportion to one another that combustion will occur when ignited; and a plasticizer selected from the group consisting of from about 4% to about 5% polyvinyl butyral, about 8% to about 12% of a 2.5% aqueous ethyl cellulose solution and mixtures thereof.

3. An electrical heating element having improved mechanical stability, room temperature fracture toughness, oxidation resistance at temperatures up to 1900° C., and stable electrical conductivity at said temperatures, comprising a ceramic composite formed by micropyretic synthesis of a non-solid, pliable composition comprising, based on the total weight of said composition:

a filler material selected from the group consisting of from about 1% to about 50% silicon carbide, up to about 71% $MoSi_2$, up to about 10% $SiO_2$, up to about 10% $Y_2O_3$, up to about 10% $Si_3N_4$, up to about 0.5% BN, up to about 1% chromium, up to about 1% boron, up to about 0.5% aluminum, up to about 10% $Al_2O_3$, up to about 0.5% silicon, about up to about 7% $ZrO_2$ and mixtures thereof; a reactive system consisting essentially of from about 7% to about 30% $MoO_3$, about 2.5% to about 11% aluminum, about 2.5% to about 38% silicon; and up to about 11% carbon, which materials will react exothermically with one another and are present in such proportion to one another that combustion will occur when ignited; and a plasticizer selected from the group consisting of from about 10% to about 15% polyvinyl butyral, about 8% to about 15% of a 2.5% aqueous ethyl cellulose solution, about 8% to about 10% of a mixture of fused and/or liquid silica with equal volumetric amounts of colloidal alumina, zirconia and cerium acetate, about 4% to about 10% bentonite and mixtures thereof.

4. An electrical heating element having improved mechanical stability, room temperature fracture toughness, oxidation resistance at temperatures up to 1900° C., and stable electrical conductivity at said temperatures, comprising a ceramic composite formed by micropyretic synthesis of a non-solid, pliable composition comprising, based on the total weight of said composition:

a filler material selected from the group consisting of from about 35% to about 40% silicon carbide, about 7% to about 8% $Y_2O_3$, about 1.7% to about 2% $Al_2O_3$, about 7% to about 8% $SiO_2$, and about 1.7% to about 2% MgO and mixtures thereof;

a reactive system consisting essentially of from about 25% to about 30% titanium, and about 9% to about 11% silicon, which materials will react exothermically with one another and are present in such proportion to one another that combustion will occur when ignited; and as a plasticizer, from about 8% to about 12% of a 2.5% aqueous ethyl cellulose solution.

* * * * *